US010929433B2

(12) United States Patent
Rorato

(10) Patent No.: US 10,929,433 B2
(45) Date of Patent: Feb. 23, 2021

(54) QUERYING A DATABASE WITH MORPHOLOGY CRITERION

(71) Applicant: Dassault Systemes, Velizy Villacoublay (FR)

(72) Inventor: Remy Rorato, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 858 days.

(21) Appl. No.: 15/629,024

(22) Filed: Jun. 21, 2017

(65) Prior Publication Data

US 2017/0371948 A1    Dec. 28, 2017

(30) Foreign Application Priority Data

Jun. 28, 2016 (EP) ................................. 16176763

(51) Int. Cl.
*G06F 16/00* (2019.01)
*G06F 16/28* (2019.01)
*G06F 16/904* (2019.01)
*G06F 16/242* (2019.01)
*G06F 16/583* (2019.01)
*G06K 9/00* (2006.01)

(52) U.S. Cl.
CPC ........ *G06F 16/283* (2019.01); *G06F 16/2428* (2019.01); *G06F 16/5854* (2019.01); *G06F 16/904* (2019.01); *G06K 9/00214* (2013.01)

(58) Field of Classification Search
CPC ............... G06F 16/2428; G06F 16/283; G06F 16/5854; G06F 16/904
See application file for complete search history.

(56) References Cited

U.S. PATENT DOCUMENTS 5,966,140 A    10/1999    Popovic et al.
6,397,206 B1    5/2002    Hill
(Continued)

FOREIGN PATENT DOCUMENTS

CN    1647112    7/2005
CN    101059335    10/2007
(Continued)

OTHER PUBLICATIONS

Chiang, L., et al. "Identification of Patterns of Repeated Parts in Solid Objects", IMATI Report Series, pp. i-111, Nov. 2, 2016.
(Continued)

*Primary Examiner* — Dinku W Gebresenbet
(74) *Attorney, Agent, or Firm* — Hamilton, Brook, Smith & Reynolds, P.C.

(57) ABSTRACT

The invention notably relates to a computer-implemented method for querying a database. The database comprises 3D modeled objects that each represent a mechanical part. The database further comprises, for each 3D modeled object, a respective morphology signature. The method comprising: providing a query that includes a morphology criterion; returning, as results of the query, respective 3D modeled objects of the database, a respective 3D modeled object being returned based on an extent to which the respective 3D modeled object has a morphology signature that respects the morphology criterion. Such a method improves the field of searching mechanical parts in a database.

16 Claims, 13 Drawing Sheets

(56) References Cited

U.S. PATENT DOCUMENTS

| | | |
|---|---|---|
| 6,570,568 B1 | 5/2003 | Horn et al. |
| 6,615,503 B1 | 9/2003 | Nzomigni et al. |
| 6,642,929 B1 | 11/2003 | Essafi et al. |
| 6,721,614 B2 | 4/2004 | Duncan et al. |
| 6,768,928 B1 | 7/2004 | Nagasawa et al. |
| 6,778,970 B2 | 8/2004 | Au |
| 7,027,054 B1 | 4/2006 | Cheiky |
| 7,269,808 B2 | 9/2007 | Bruce et al. |
| 7,583,272 B2 | 9/2009 | Ramani et al. |
| 7,657,083 B2 | 2/2010 | Parr |
| 7,688,318 B2 | 3/2010 | O'Malley, III et al. |
| 7,733,340 B1 | 6/2010 | Desimone et al. |
| 7,913,190 B2 | 3/2011 | Grimaud |
| 8,248,407 B2 | 8/2012 | Deslandes |
| 8,416,240 B1 | 4/2013 | Kuffner |
| 8,606,774 B1 | 12/2013 | Makadia |
| 8,659,596 B2 | 2/2014 | Corazza |
| 8,812,272 B2 | 8/2014 | Martin et al. |
| 8,976,179 B2 | 3/2015 | Kuffner |
| 8,982,122 B2 | 3/2015 | Corazza |
| 9,239,895 B2 | 1/2016 | Huang et al. |
| 9,304,323 B2 | 4/2016 | Fonte |
| 9,449,430 B2 | 9/2016 | Janvier |
| 9,798,835 B2 | 10/2017 | Rorato |
| 9,830,703 B2 | 11/2017 | Meyer |
| 9,881,388 B2 | 1/2018 | Rorato et al. |
| 9,916,345 B1 | 3/2018 | Makadia |
| 9,916,538 B2 | 3/2018 | Zadeh et al. |
| 10,198,488 B2 | 2/2019 | Marini |
| 10,303,784 B2 | 5/2019 | Rorato |
| 10,719,549 B2 | 7/2020 | Lieutier |
| 2002/0008700 A1 | 1/2002 | Fuki |
| 2002/0095276 A1 | 7/2002 | Rong et al. |
| 2002/0167516 A1 | 11/2002 | Loop |
| 2003/0191627 A1 | 10/2003 | Au |
| 2004/0122630 A1 | 6/2004 | Fife |
| 2007/0279414 A1 | 12/2007 | Vandenbrande |
| 2008/0143714 A1 | 6/2008 | Huang |
| 2008/0260238 A1 | 10/2008 | Pfister et al. |
| 2009/0157649 A1 | 6/2009 | Papadakis et al. |
| 2009/0182450 A1 | 7/2009 | Goldschmidt |
| 2010/0082142 A1 | 4/2010 | Usadi et al. |
| 2010/0121626 A1 | 5/2010 | Montana et al. |
| 2011/0069336 A1 | 3/2011 | Lin et al. |
| 2011/0224813 A1 | 9/2011 | Takatsuka |
| 2012/0078587 A1 | 3/2012 | Martin et al. |
| 2012/0173212 A1 | 7/2012 | Rameau |
| 2014/0184594 A1 | 7/2014 | Janvier |
| 2014/0188439 A1 | 7/2014 | Rorato |
| 2014/0192050 A1 | 7/2014 | Qiu |
| 2014/0354636 A1 | 12/2014 | Rorato et al. |
| 2014/0379309 A1 | 12/2014 | Banta et al. |
| 2015/0032420 A1 | 1/2015 | Tristano et al. |
| 2015/0199850 A1* | 7/2015 | Uematsu ............ G02B 27/017 345/633 |
| 2016/0004739 A1 | 1/2016 | Tyercha et al. |
| 2016/0019270 A1* | 1/2016 | Jones ................ G05B 19/4097 700/98 |
| 2016/0117792 A1 | 4/2016 | Rolland-Neviere |
| 2016/0217610 A1* | 7/2016 | Liu ........................ G06T 1/20 |
| 2016/0350335 A1 | 12/2016 | Rorato |
| 2016/0350387 A1 | 12/2016 | Marini et al. |
| 2018/0004836 A1 | 1/2018 | Lewis |
| 2018/0137118 A1 | 5/2018 | Lieutier |
| 2019/0179977 A1 | 6/2019 | Van der Velden |

FOREIGN PATENT DOCUMENTS

| | | |
|---|---|---|
| CN | 101995231 | 3/2011 |
| EP | 0 646 884 A2 | 4/1995 |
| EP | 0 646 884 A3 | 7/1995 |
| EP | 0 964 364 | 12/1999 |
| EP | 2 169 567 | 3/2010 |
| EP | 2 387 004 | 11/2011 |
| JP | 2000-57184 A | 2/2000 |
| JP | 2001250130 | 9/2001 |
| JP | 2003518294 | 6/2003 |
| JP | 2005049923 | 2/2005 |
| JP | 2006285570 | 10/2006 |
| JP | 2010211629 | 9/2010 |
| JP | 2012069108 | 4/2012 |
| WO | WO 2004/068300 | 8/2004 |
| WO | WO 2008/094170 | 8/2008 |
| WO | WO 2011/103031 | 8/2011 |
| WO | 2013/155858 A1 | 10/2013 |
| WO | WO 2015/085435 | 12/2014 |

OTHER PUBLICATIONS

Dang, Q.V., et al., "Similarity Detection for Free-Form Parametric Models", 21st International Conference on Computer Graphics, Visualization and Computer Vision, pp. 239-248 (2013).

European Search Report for EP 16 30 6790 dated Jun. 7, 2017, 3 pages.

Gordon, L., "Comparing 3D CAD Modelers—What Designers should know about history-based and dynamic schemes", Machine Design, pp. 1-4, Nov. 22, 2006.

3DPartFinder by 3DSemantix—Geometric search engine > Home; http://www.3dpartfinder.com. 2 pages (Date unavailable).

Altmeyer, J., et al., "Reuse of Design Objects in CAD Frameworks", IEEE/ACM International Conference on Computer-Aided Design, Digest of Technical Papers, pp. 754-761, Nov. 6, 1994.

Babic, B., et al., "A Review of Automated Feature Recognition with Rule-Based Pattern Recognition", Computers in Industry, 59:321-337 (2008).

Beardsly, J., "Seamless Servers: The case for and against", Massively Multiplayer Game Development, Section 3.1, 211-227 (Date unavailable).

Besplov, D., et al., "Local Feature Extraction and Matching Partial Objects", Computer Aided Design, vol. 38: 1020-1037 (2006).

Biasotti, S., et al., "Sub-part correspondence by structural descriptors of 3D shapes", Computer Aided Design, 38(9): 1002-1019 (Sep. 2006).

Boltcheve, D., "An Iterative Algorithm for Homology Computation on Simplical Shapes", Computer Aided Design, vol. 43, No. 11, pp. 1457-1467 Sep. 2, 2011.

Briere-Cote, A., et al., "Comparing 3D CAD Models: Uses, Methods, Tools and Perspectives", Computer-Aided Design and Applications, 9(6): 771-794 (2002).

Cardone, A., et al. "A Survey of Shape Similarity Assessment Algorithms for Product Design and Manufacturing Applications", Journal of Computing and Information Science in Engineering, vol. 3 No. 2, pp. 109-118, Jan. 1, 2003.

Clark, D.E.R., et al., "Benchmarking shape signatures against human perceptions of geometric similarity", Computer-Aided Design, 38(9): 1038-1051 (Sep. 2006).

Cornelio, A., et al., "Integration and Cataloging of Engineering Design Information", Systems Integration '90, IEEE Comput., Soc., US, pp. 720-729 (Apr. 23, 1990).

Creo™ Parametric Data Sheet, © 2011 Parametric Technology Corporation, http://www.creo.uk.com/creo_parametric_mapping.htm, last accessed Mar. 27, 2014.

Daras, P., et al., "A 3D Shape Retrieval Framework Supporting Multimodal Queries", Int J. Comput Vis 89: 229-247 (2010).

European Search Report for EP 10 30 6026 dated Feb. 3, 2011.

European Search Report for EP 12 30 6720 dated Jul. 4, 2013.

European Search Report for EP 12 30 6721 dated May 13, 2013.

European Search Report for EP 13 30 5700 dated Aug. 14, 2013.

European Search Report for EP 16 17 6763 dated Dec. 1, 2016.

European Search Report for EP 16 30 6488 dated May 23, 2017.

Falcidieno, B., et al., "A System for Extracting and Representing Feature Informaiton Driven by the Application Context", Proceedings of the IEE International Conference on Robotics and Automation, 1672-1678 (1990).

Fonseca, M.J., et al., "Towards content-based retrieval of technical drawings through high-dimensional indexing", Computers and Graphics, 27(1): 61-69 (Feb. 2003).

(56) References Cited

OTHER PUBLICATIONS

Frosini, P., et al. "Combining Persistent Homology and Invariance Groups for Shape Comparison", Discrete & Computational Geometry, vol. 55, No. 2, pp. 373-409, Feb. 2, 2016.
Funkhouser, T., et al., "Modeling by Example", ACM Transactions on Graphics, 23(3): 652-663 (Aug. 1, 2004).
Funkhouser, T., et al., "A Search Engine for 3D Models", ACM Transactions on Graphics, vol. V, No. N 10 202002 (Date unavailable).
Imoru, C.O., et al., "On a Version of the Banach's Fixed Point Theorum", General Mathematics, vol. 16, No. 1, pp. 25-32 (2008).
Ismail, et al., "Feature recognition patterns for form features using boundary representation models", International Journal of Advanced Manufacturing Technology Springer-Veraguk, vol. 20, No. 8, pp. 553-556, (2002).
Kao, et al, "Extraction of 3D Object Features from CAD Boundary Representation using the Super Releaton Graph Method", Transcations on Pattern Analysis and Machine Intelligence, IEEE, Piscataway, USA, vol. 17, No. 12, pp. 1228-1233, Dec. 1, 1995.
Kazhdan, M., et al., "Harmonic 3D Shape Matching", ACM SIGGRAPH Symposium on Computer Animation, p. 191 (Jul. 21, 2002).
Kazhdan, M., et al., "Rotation Invariant Spherical Harmonic Representation of 3D Shape Descriptors", Eurographics Symposium on Geometry Processing, 9 pages (2003).
Lee, K.S., et al., "Framework of an evolutionary design system incorporating design information and history", Computers in Industry, 44(3): pp. 205-227 (Apr. 2001).
Luije, M., et al. Automatic Discovery of Common Design Structures in CAD models, Computer & Graphics 34, pp. 545-555 (2010).
Maranzana, R., "3D Data Mining Part and Information Re-Use in a PLM Context", Proceedings of GT2007, May 14-17, 2013, Montreal, CA, ASME Paper: GT2007-27966, American Society of Mechanical Engineers, NY, NY 2007. http://dx.doi.org/10.1115/GT2007-27966, 37 pages (2013).
Munkres, J.R., "Elements of algebraic topology", Addison-Wesley Publishing Company, Inc. 1984.
Oudot, S., Topological Signatures:, Presentation given in Springs School in LA Marsa, pp. 1-86, Apr. 2016.
Pauly, et al., "Discovering structural regularity in 3D geometry", ACM Transactions on Graphics (TOG)—Proceedings of ACM SIGGRAPH TOG Homepage, vol. 27, No. 3, Aug. 2008.
Papadakis, P., et al., "Efficient 3D shape matching and retrieval using a concrete radialized spherical projections representation", ScienceDirect, 40: 2437-2452 (2007).
Petre, R.D., et al., "An experimental evaluation f view-based 2D/3D indexing methods" 2010 IEEE 26th Convention of Electrical and Electronic Engineers in Israel, pp. 924-928, Nov. 2010.
Santa-Cruz, D., et al., "Compression of Parametric Surfaces for Efficient 3D Model Coding", VCIP, 4671: 280-291 (2002).
Shih, R., Parametric Modeling with Creo™ Parametric: An Introduction to Creo™ Parametric 1.9 SDC Publications © 2011 (table of contexts only).
Shikhare, D., et al. "Compression of Large 3D Engineering Models Using Automatic Discovery of Repeating Geometric Features", National Centre for Software Technology, 233-240 (2001).
Tangelder, J., et al., "A Survey of Content Based 3D Shape Retrieval Methods", Multimedia Tools and Applications, Kluwer Academic Publishers, vol. 39, No. 3, pp. 441-471; Dec. 8, 2007.
Wang, et al. "EQSM: An efficient high quality surface grid generation method based on remeshing", Computer Methods in Applied Mechanics and Engineering, North Holland, Amsterdam, vol. 195 No. 41-43, pp. 5621-5633, Aug. 15, 2006.
Werghi, D., et al. "Extracting Ordered Patterns from a Triangular Mesh Surface", IEEE Potentials, IEEE, NY, NY, USA, vol. 30, No. 6, pp. 34-43, Nov. 1, 2011.
Working with Pattern Recognition; http://learningexchange.ptc.com/tutorial/519/working-with-pattern-recognition (Date unavailable).
Yang, M., et al., "A Survey of Shape Feature Extraction Techniques", Peng-Yeng Yin, Pattern Recognition, In-Tech, pp. 43-90 (2008).
Wagner, et al. "Modeling Software with Finite State Machines" Auerbach Publications, 2006.
Boussuge, et al., "Template-based Geometric Transformations of a Functionally Enriched DMU into FE Assembly Models," Computer-Aided Design & Applications, 11(4), 436-449 (2014).
Marchetta, et al., "An artificial intelligence planning approach to manufacturing feature recognition," Computer-Aided Design, 42:248-256 (2010).
European Search Report, EP18212155.8, "Methods And Systems For Authoring Simulation Scenarios," dated May 24, 2019.
Assflag, J, et al., "Retrieval of 3d objects using curvature maps and weighted walkthroughs," In 12th International Conference on Image Analysis and Processing, 2003 Proceedings, pp. 348-353, IEEE, (2003).
Official Notice of Rejection, JP2016-104365, entitled "Querying Database With Thickness Criterion," dated Jul. 7, 2020.
Danglade et al., "A Priori Evaluation of Simulation Models Preparation Processes Using Artificial Intelligence Techniques," Computers in Industry, vol. 91, pp. 45-61 (2017).
Danglade et al., "On the use of Machine Learning to Defeature CAD Models for Simulation," Computer Aided Design & Applications, vol. 11, No. 3, pp. 358-368 (2013).
Li et al., "Preparation of CAD Model for Finite Element Analysis," 2010 Int'l Conf. on Computer Mechatronics Control and Electronic Engineering, CMCE 2010, pp. 491-494 (2010).
Oberg et al., "Machinery's Handbook 27th Edition," Industrial Press, Inc., New York, N.Y. (2004).

\* cited by examiner

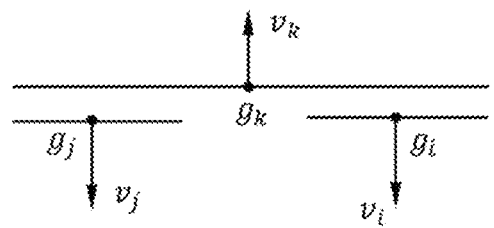 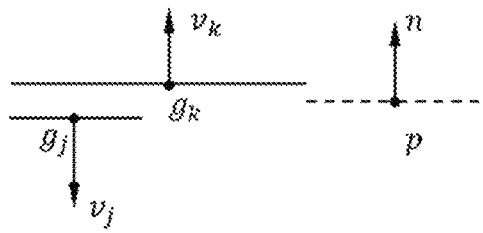
FIG. 28                        FIG. 29
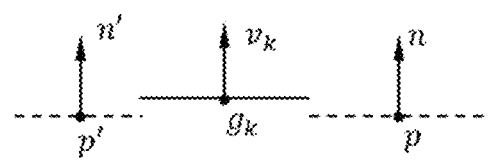
FIG. 30
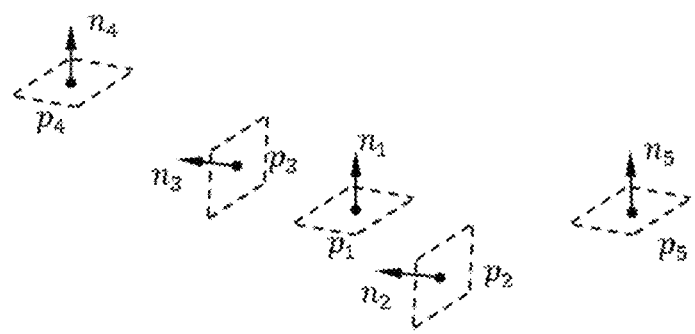
FIG. 31

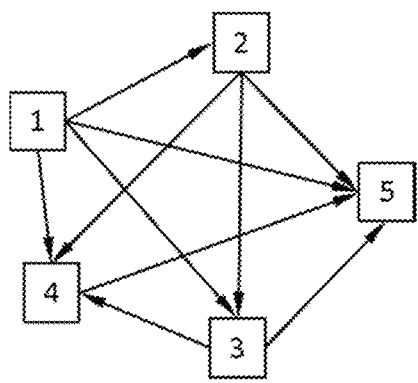
FIG. 32
| | 2 | 3 | 4 | 5 |
|---|---|---|---|---|
| 1 | | | | |
| 2 | X | | | |
| 3 | X | X | | |
| 4 | X | X | X | |
FIG. 33
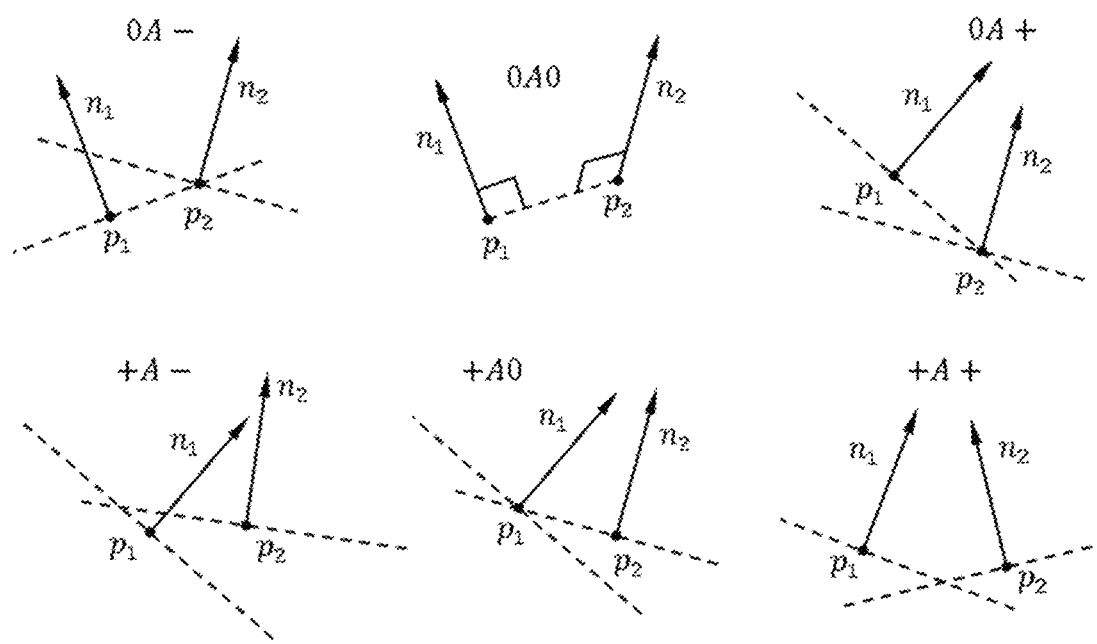
FIG. 34

|  | $(p_2,n_2)$ | $(p_3,n_3)$ | $(p_4,n_4)$ | $(p_5,n_5)$ |
|---|---|---|---|---|
| $(p_1,n_1)$ | $+A+$ | $+A-$ | $+S-$ | $+S-$ |
| $(p_2,n_2)$ | - | $+S-$ | $+A-$ | $-A-$ |
| $(p_3,n_3)$ | - | - | $+A-$ | $-A-$ |
| $(p_4,n_4)$ | - | - | - | $0S0$ |

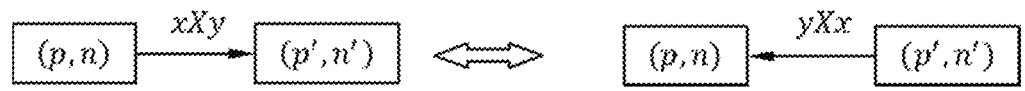
FIG. 40
|  | $(p_2, n_2)$ | $(p_3, n_3)$ | $(p_4, n_4)$ | $(p_5, n_5)$ |
|---|---|---|---|---|
| $(p_1, n_1)$ | +A+ | +A+ | +S+ | +S+ |
| $(p_2, n_2)$ | - | +S+ | +A+ | -A+ |
| $(p_3, n_3)$ | - | - | -A+ | +A+ |
| $(p_4, n_4)$ | - | - | - | 0S0 |
FIG. 41
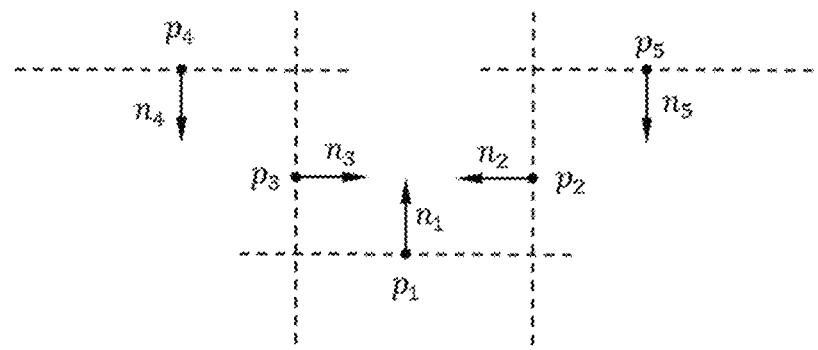
FIG. 42

QUERYING A DATABASE WITH MORPHOLOGY CRITERION

RELATED APPLICATION(S)

This application claims priority under 35 U.S.C. § 119 or 365 to European, Application No. 16176763.7, filed Jun. 28, 2016. The entire teachings of the above application(s) are incorporated herein by reference.

FIELD OF INVENTION

The invention relates to the field of computer programs and systems, and more specifically to a method, system and program for querying a database that comprises 3D modeled objects that each represent a mechanical part, and to such a database.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systémes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In this context, there is a need to search existing mechanical parts in a database according to different criteria.

Searching parts in a database according to a predefined criterion is often performed through three steps. The first step is to compute and associate to each solid of the database a so-called "signature" or "descriptor". A signature is a compact information that synthetizes a typical aspect of the part. The second step is for the user to specify a request by setting a signature. Typically, this signature can be the one of a selected part and the goal may be to find similar parts of the database. Also, the signature can be the one of a part being designed and the goal is, again, to find similar parts of the database. The third step is the searching step. It is for the system to find parts of the database the signatures of which correspond to the user-inputted signature. Signatures are massively compared during this step.

A signature may ideally be designed to require a small amount of memory, to be easy to compute and to be very rapid to compare, and yet lead to a relevant result with a high recall and a high precision.

Existing signatures for shape description are often based on spherical functions. The following is a list of known solutions that employ this framework:
document EP 2169567 A2;
Rotation Invariant Spherical Harmonic Representation of 3D Shape Descriptors, by M. Kazhdan, T. Funkhouser, and S. Rusinkiewicz, Eurographics Symposium on Geometry Processing (2003); and
Efficient 3D shape matching and retrieval using a concrete radicalized spherical projection representation, by P. Papadakis, I. Pratikakis, S. Perantonis, T. Theoharis, Pattern Recognition 40 (2007) 2437-2452.

Such radial-function-based shape descriptors are designed to capture the overall shape of a solid, including topology and relative proportions. They are known to be questionable in the mechanical domain.

Therefore, for precise solid comparison, the signature may sometimes include geometrical information closely related to the boundary description of the solids. The following is a known solution that employs this framework:
document WO 2015/085435 A1.

In such geometry-based solutions, at least locally, similar solids share the same shape and the same dimensions. This can be restrictive, and also prohibitive in terms of memory consumption and time of computations, due to the fact that relatively heavy information (i.e. relatively precise geometry) is stored and compared.

Thus, despite the existing literature, there is still a need for improving the field of searching mechanical parts in a database.

SUMMARY

It is therefore provided a computer-implemented method for querying a database. The database comprises 3D modeled objects that each represent a mechanical part. The database further comprises, for each 3D modeled object, a respective morphology signature. The method comprises providing a query that includes a morphology criterion. The method also comprises returning, as results of the query, respective 3D modeled objects of the database. A respective 3D modeled object is returned based on an extent to which the respective 3D modeled object has a morphology signature that respects the morphology criterion.

The method may comprise one or more of the following:
the morphology signature comprises, for each respective one of a set of pairs of walls of the respective 3D modeled object, a label representative of a relative orientation between the two walls of the respective pair;
the labels form a clique graph over the walls of the set of pairs of walls;
each label of the morphology signature is representative of a relative orientation between at least substantially planar walls;
each label of the morphology signature is representative of a relative orientation between thin walls;
each label is determined within a predetermined finite set of labels; and/or
each wall is associated to a respective node that includes a point and a respective normal vector, the label representative of the relative orientation between a wall associated to a node ($p_1$, $n_1$) and a wall associated to a node ($p_2$, $n_2$) being defined according to the sign of the distance from $p_2$ to the plane defined by ($p_1$, $n_1$), the sign of the distance from $p_1$ to the plane defined by ($p_2$, $n_2$), the sign of the norm of the normal vectors cross product, and/or the sign of the normal vectors scalar product.

It is also provided a database that comprises 3D modeled objects. The database comprises, for each 3D modeled object, a respective morphology signature.

In examples, the respective morphology signature may comprise, for each respective one of a set of pairs of walls of the respective 3D modeled object, a label representative of a relative orientation between the two walls of the respective pair.

It is also provided a method for constructing such a database.

In examples, the method may comprise providing the modeled objects, determining, for each 3D modeled object, the respective morphology signature of the 3D modeled object; and storing a relation between each 3D modeled object and its respective morphology signature.

It is also provided a computer program comprising instructions for performing any or several of the above methods.

It is also provided a data storage medium having recorded thereon the computer program.

It is also provided a system comprising a processor coupled to a memory, the memory having recorded thereon the computer program.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Embodiments of the invention will now be described, by way of non-limiting example, and in reference to the accompanying drawings, where:

FIGS. 19-45 illustrate examples of the method.

DETAILED DESCRIPTION

A description of example embodiments follows.

The teachings of all patents, published applications and references cited herein are incorporated by reference in their entirety.

Figure 1:
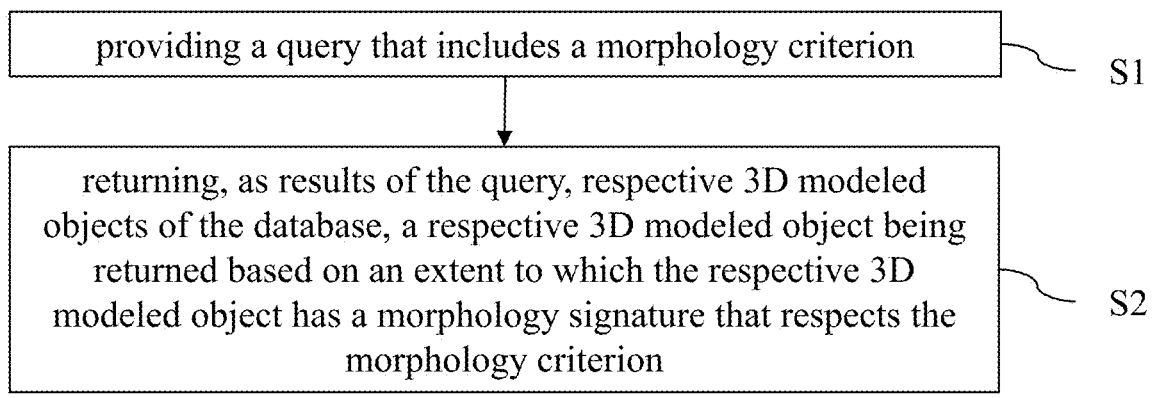
FIG. 1 shows a flowchart of an example of the method.

With reference to the flowchart of FIG. 1, it is proposed a computer-implemented method for querying a database that comprises (e.g. data of) 3D modeled objects. The 3D modeled objects represent mechanical parts (i.e. each 3D modeled object of the database represents a mechanical part—at least its outer shape—, e.g. the term "mechanical part" also referring generically to an assembly and/or to a portion thereof).

The database further comprises, for each 3D modeled object, a respective morphology signature. In other words, the database stores a relation (e.g. in the form of pointers and/or links) between each 3D modeled object and a respective value of a morphology signature function (e.g. the morphology signature function being possibly predetermined and/or the same function, for all the considered 3D modeled objects). The morphology signature function is a function defined on a domain of 3D modeled objects (and thus can take each of the considered 3D modeled objects as input). The value of the morphology signature function for a given 3D modeled object (that is, the morphology signature of said given 3D modeled object) constitutes synthetic information on the morphology of the 3D modeled object. The term "synthetic" refers to the fact that the morphology signature constitutes smaller data than the initial data defining the given 3D modeled object. The morphology signature function discriminates between different morphologies. In other words, two 3D modeled objects having different morphologies also have unmatchable morphology signatures, at least statistically. However, two different 3D modeled objects yet having the same morphology also have morphology signatures that can be matched (e.g. the same), at least statistically.

The method comprises the step of providing S1 (e.g. to a database or to a plug-in/script running on such a database, e.g. at a client computer system or to a server computer system—i.e. database host—, e.g. the client possibly being confounded with the server, which may be the case if they are hosted by the same machine for example) a query that includes a morphology criterion (as part of the data that define the query, and e.g. at least as one of the possibly several criteria making the query, e.g. the query possibly including other criteria and optionally weights assigned to the different criteria, as very classical in the field of database search). The method also comprises the step of returning S2 (e.g. to the client or at the server), as results of the query (i.e. the returned data including one or more such results or even no/null result—which means that not necessarily several results are returned, the plural form being used as it is the generic expression—, depending on the query and/or on the content of the searched data), respective 3D modeled objects of the database. A respective 3D modeled object is returned based on an extent to which the respective 3D modeled object has a morphology signature that respects the morphology criterion (in other words, an extent to which the morphology signature, associated in the database to the 3D modeled object considered for being returned, respects the morphology criterion). The expression "morphology criterion" designates any way to filter and/or rank the 3D modeled objects of the database based only on their respective morphology signature.

Such a method improves the querying of a database that comprises 3D modeled objects that represent mechanical parts.

Notably, the method provides a solution to perform a search based on the morphology in a database thanks to its steps S1 and S2 and to the definition of a morphology signature. This is particularly useful in the field of mechanical design, where actors—notably designers who would like to retrieve previously designed parts in order to reuse them—often think of mechanical parts in terms of their morphology (among others). Thanks to the definition of the morphology signature, the method ensures the returning at S2 of relatively relevant results.

The morphology signature of a respective 3D modeled object represents the morphology of the mechanical part that is represented by the respective 3D modeled object. The morphology of a mechanical part is information that represents relative orientations of slice-like portions (or members) of the mechanical part, but not their dimensions or proportions. A slice-like portion of the mechanical part is a portion of material that has the general shape of a substantially planar shape, e.g. relatively large with respect to its thickness and/or relatively thin, e.g. regardless of through holes and/or protuberances thereat. The morphology attribute thus discriminates between mechanical parts yet creating groups of similar parts (i.e. having the same morphology), similarly to the process by which alphabets discriminate letters, and yet allow to recognize instances of a same letter, said instances differing from each other merely by the fact that they are written by different persons or using different fonts. The morphology may be one of a symbolic typology, e.g. any one of a list of types of shape, for example including any one or a combination of X-shape, T-shape, H-shape, Y-shape, Z-shape, Π-shape, O-shape, U-shape, and/or Ω-shape. This way, a user may enter a morphology criterion merely by inputting a symbol or by inputting a 3D modeled object that is shaped according to such symbol (thus thinking in terms of symbols).

Figures 2, 3:
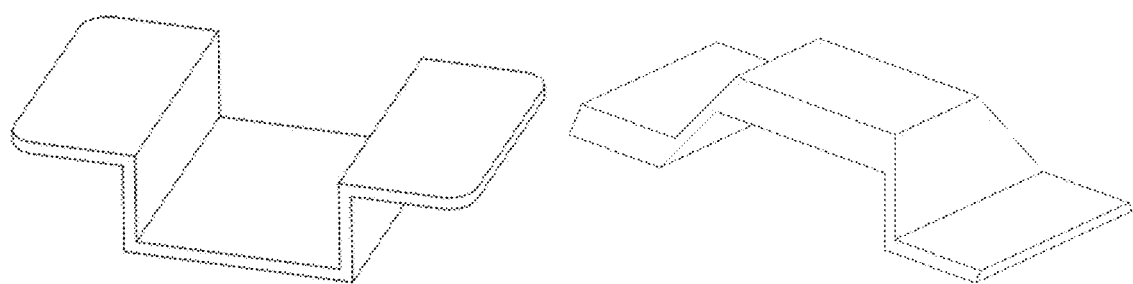
FIGS. 2-3 show two mechanical parts having the same morphology.

Prior art technologies fail to identify a typical morphology. Prior art technologies indeed are most often closely related to dimensional properties, including relative proportions, or, conversely, they are mainly independent of dimensions. For example, one may consider the input solid of FIG. 2 and suppose that the database includes the solid of FIG. 3. These two parts feature an Ω-shape. Prior art algorithms are unable to recognize this similar Ω-shape morphology, as opposed to the method of FIG. 1.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database, e.g. on which the query is executed. The memory is any hardware adapted for such storage, possibly comprising several physical distinct parts (e.g. one for the program, and possibly one for the database). The system may thus be a client-server system, or a mere client system (the database being stored on a remote server, the method of FIG. 1 being thereby seen from the point of view of the client in such a case) or a mere server system (the query stemming from a remote client system, the method of FIG. 1 being thereby seen from the point of view of the server in such a case). It is noted that the method of FIG. 1 may be indifferently seen as implemented from the client point of view and/or from the server point of view, as both communicate to perform the method. The returning S2 can indeed be active (database), or passive (client requesting the query).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

In the case of the method, the database comprises 3D modeled objects that represent mechanical parts. Each respective 3D modeled object of the database is furthermore associated (e.g. in a row or any other type of relation, depending on the database technology at use) to the value of the morphology signature of said respective object, the value of the morphology signature being as defined earlier (and it may be defined as a value of a field of the database or covering several fields, this being an implementation detail pertaining to database optimization and not further discussed here). Such a database can be built and/or incremented with new 3D modeled object(s) in order for example to be used in the querying method of FIG. 1 (if the database is appropriately configured). This only requires that it be possible to determine, for each 3D modeled object, the respective morphology signature of the 3D modeled object. The database can thus be constructed in any way and it can be stored on the memory of the system as mentioned above, or on any other medium adapted for that. Such a database allows retrieving 3D modeled objects according to the method of FIG. 1, and it is thus a tool that may for example accelerate CAD design (by helping the designer retrieve relevant results and re-use them instead of re-designing everything from scratch, e.g. if the system is provided with such a re-use functionality).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

Any 3D modeled object contemplated by the method may represent the geometry of a product to be manufactured in the real world subsequent to the completion of its virtual design with for instance a CAD software solution or CAD system, such as a (e.g. mechanical) part or assembly of parts. A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled objects contemplated by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electromechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), and/or a packaging (including e.g. food and beverage and tobacco, beauty and personal care, household product packaging). Additional examples for which the morphology criterion is a particularly useful one to perform a database query are provided alter.

By PLM system, it is meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systemes under the trademark DELMIA®.

By CAE solution, it is additionally meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systemes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systemes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systemes under the trademark ENOVIA®.

Figure 4:
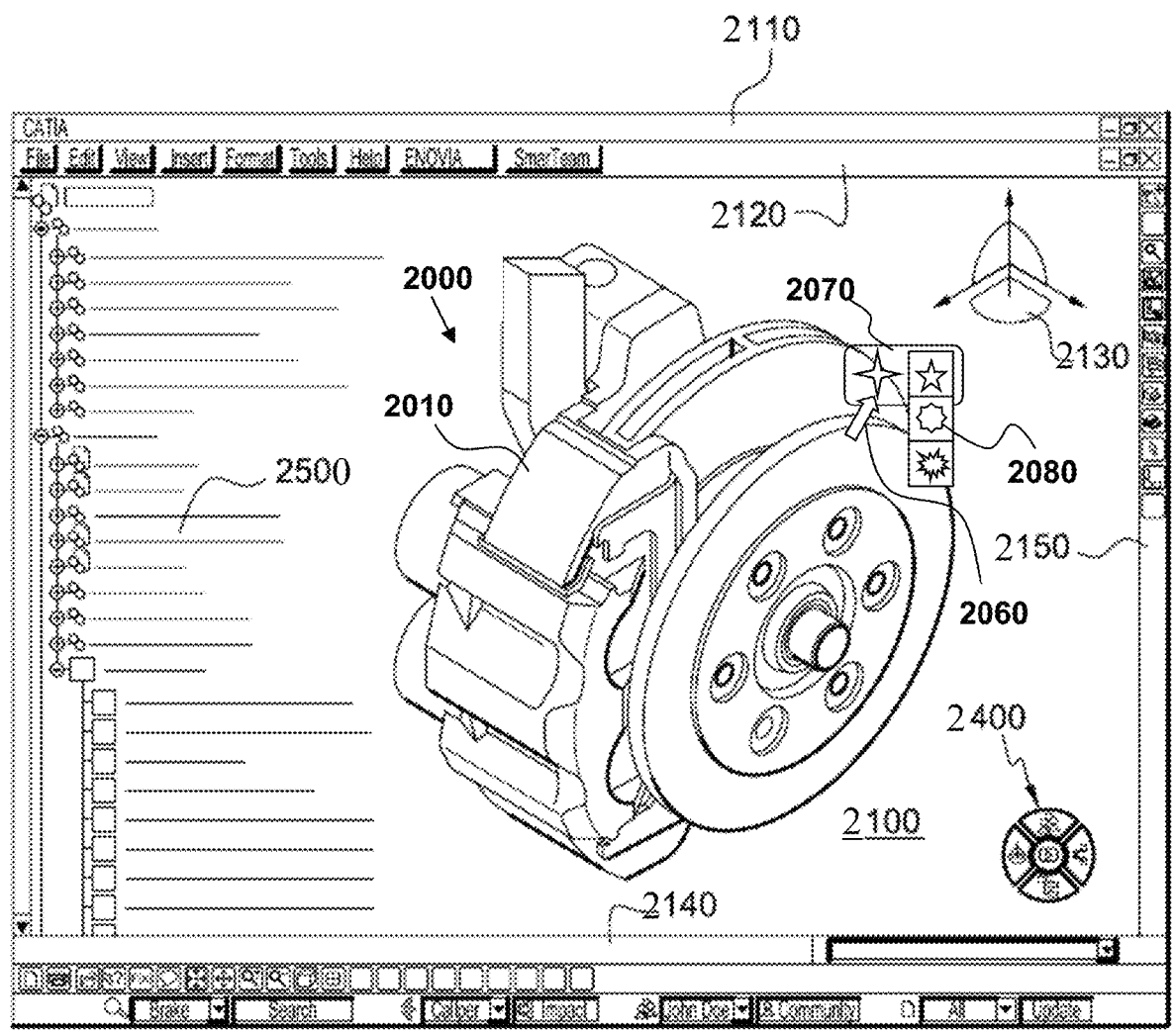
FIG. 4 shows an example of a graphical user interface of the system.

FIG. 4 shows an example of the GUI of the (client) system for performing the method, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art, e.g. one such operation/function being for launching the method of FIG. 1 (e.g. based on input modeled object 2000, or e.g. leading to display of resulting modeled object 2000, e.g. after selection among other results). Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of FIG. 4, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 5:
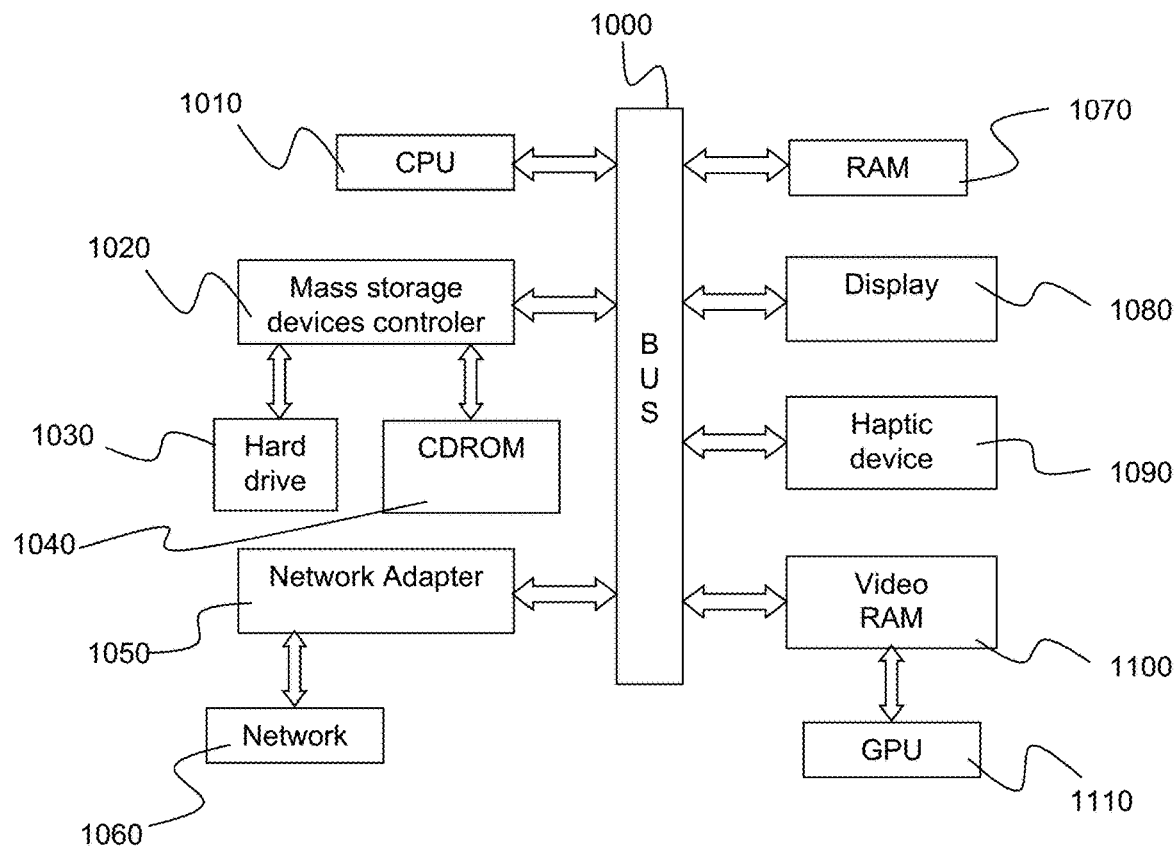
FIG. 5 shows an example of the system.
Figure 6:
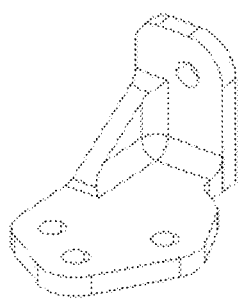
FIGS. 6-18 show 3D modeled objects of examples of the database and pictures of parts represented by such 3D modeled objects.
Figure 7:
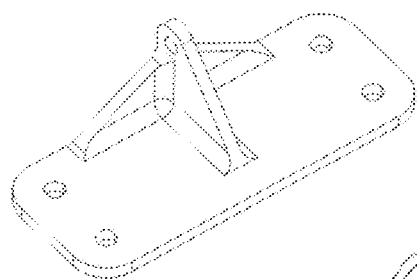
Figure 8:
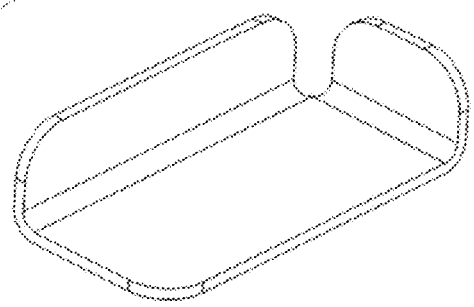
Figure 9:
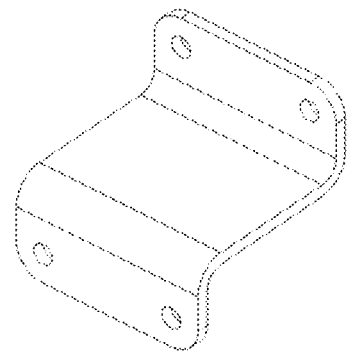
Figure 10:
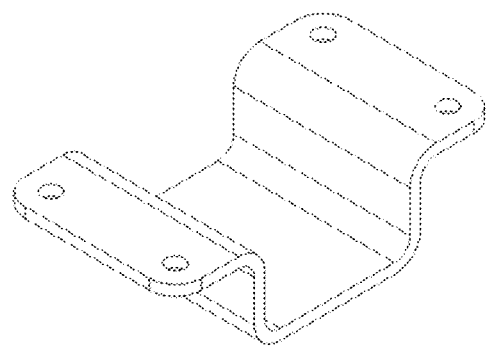
Figure 11:
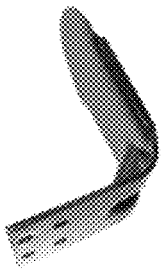
Figure 12:
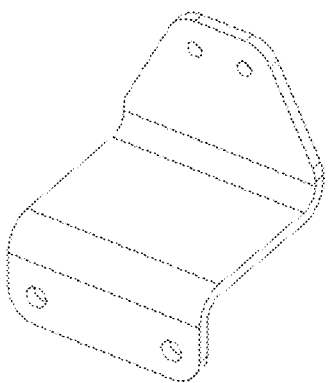
Figure 13:
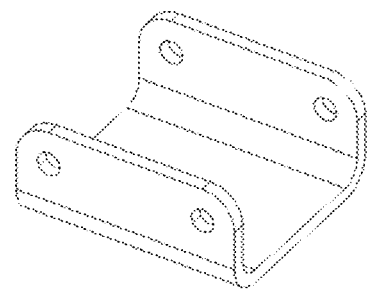
Figure 14:
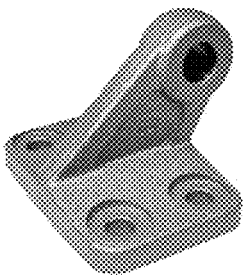
Figure 15:
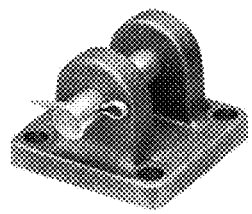
Figure 16:
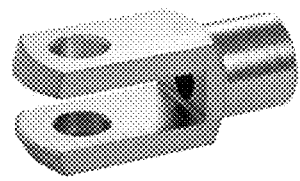
Figure 17:
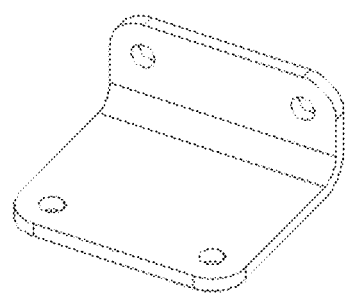
Figure 18:
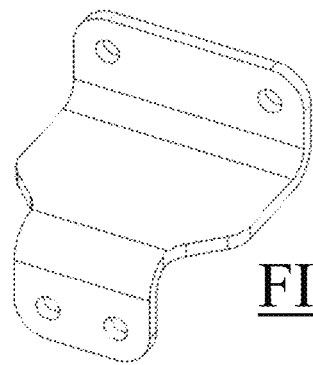

FIG. 5 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method may be part of a process of designing a 3D modeled object or it may follow such process. "Designing a 3D modeled object" designates any action or series of actions which is at least part of a process of elaborating a 3D modeled object. Thus, the method may comprise creating a first 3D modeled object from scratch (by the user), e.g. via a sketching-like process. Then the method may comprise running (on user command e.g. based on a user-input of the morphology criterion or as an—automatic—background process e.g. based on the morphology signature of the object being designed) a query according to FIG. 1. Alternatively, the morphology criterion is directly provided as a value by the user. Then the method may comprise optionally displaying the results to the user and selecting (by the user) a preferred result (if case there is at least one result). Finally the user may continue the design by modifying a result of the query (e.g. the one which has been selected), or by adding a result of the query to the current design. This can thus be useful to help a designer not unnecessarily re-design a model previously designed and re-use such previous design instead. Any other reason to perform a query according to FIG. 1 may however be contemplated. For example, the method may be used to find and e.g. delete duplicate (or almost duplicate, that is, very similar) 3D modeled objects from a database (for example in order to reduce the size of the database by eliminating redundancy), or group parts in a same morphology category or based on morphology similarity.

The method may be included in a manufacturing process, which may comprise, after performing the method, producing a physical product corresponding to the modeled object. In any case, the modeled object designed by the method may represent a manufacturing object. The modeled object may thus be a modeled solid (i.e. a modeled object that represents a solid). The manufacturing object may be a product, such as a part, or an assembly of parts. Because the method improves the design of the modeled object, the method also improves the manufacturing of a product and thus increases productivity of the manufacturing process.

The database may comprise or may consist of 3D modeled objects representing fasteners and/or the searched 3D modeled object (e.g. the 3D modeled object inputted in the morphology criterion) may represent a fastener. A fastener is a hardware device that mechanically joins or affixes two or more objects together." Querying a database of such parts and/or for such a part can make particularly efficient use of the method of FIG. 1, as such parts are conceived particularly well in terms of morphology by mechanical designers. The shape of a fastener fits positioning constraints as well as stiffening constraints that dictate its morphology. As opposed to main assembly parts, a fastener can more often be reused from one design to another. This makes the method of FIG. 1 particularly useful in such specific context. The fasteners of the database may include any one or combination of clips, cleats, stringers, clevis and/or other fixtures or assembly parts. FIGS. 6-18 show 3D modeled objects representing such parts and pictures of such parts.

The 3D modeled objects of the database may comprise or consist of a boundary representation (B-Rep) of the represented mechanical part. The notion of B-Rep is widely known in the art. The B-Reps contemplated by the method of FIG. 1 may be as defined in the two following documents incorporated herein by reference and corresponding one to the other: EP 2750107 A1 and US 2014188439 A1.

The method of FIG. 1 is now discussed in more details.

The method is for querying a database that comprises 3D modeled objects that represent mechanical parts. Querying a database means that a query is run on the database according to the classical meaning of such expression in database engineering, which is that information from the database is extracted from the database as the result of the query (possibly null). In the case of the method, 3D modeled objects of the database (that is, any characterizing data thereof) are returned, possibly for user-selection and/or user-triggering of additional data to be downloaded. This is all known per se in the field of database engineering, and notably in its application to 3D search.

As known, the query may be performed according to any type of criterion or any types of criteria. Results are then provided (one, several, or null) based on the extent to which pieces of data in the database respect the criterion/criteria, which is very classical. In the case of the method, the query includes at least a so-called morphology criterion (possibly said morphology criterion only), in other words a criterion related to the morphology, for example any search criterion related to one or more values of the morphology signature, for example an inputted searched 3D modeled object (whose signature is computer by the method). That means by definition that an extent to which potential results (at this point, data pieces of the database) match this criterion (the question of handling several criteria, for example with weights in the query, being left aside as this is an implementation detail that can be classically addressed) is evaluated to assess whether or not a piece of information is to be considered as a result or not. How exactly this extent may be evaluated is a matter of implementation. This extent may be binary (a 3D modeled object's morphology signature value respects the morphology criterion or not), or it can be progressive (strictly more than two levels of respect, possibly a continuum from a minimal—e.g. zero—value to a maximum value, e.g. 1—e.g. corresponding for example to two equal morphology values when the criterion is that results have a morphology equal to the input value). Also, how exactly it is decided that a respective 3D modeled object is a result to be returned or not based on said extent evaluated for said respective 3D modeled object is a matter of implementation too.

In examples, the method may return only a predetermined number of the most relevant results (e.g. 3D modeled objects "respecting" the morphology criterion more than the others), or only one (e.g. the "most respecting" one). In an example, the extent to which the morphology criterion is respected is a binary value and, in that example, the method may return all "respecting" 3D modeled objects—which does imply that all results are displayed to the user, at least at once, e.g. a scrolling action from the user possibly being required for that). In examples, the criterion may grasp any "non-Boolean" criterion, such as "the ten best results".

In an example, the morphology criterion is one or more values of the morphology signature. Each such value may be provided in the form of a respective input 3D modeled objects having such value, e.g. the morphology signature of the respective input 3D modeled object being computed prior to running the query, e.g. on the fly upon launching the query or previously as a background process. In such a case, for example, a 3D modeled object may (be considered by the method to) respect the morphology criterion if and only if it has a morphology signature equal (e.g. exactly or substantially) to one of the one or more values.

The morphology signature may comprise or consist of, for each respective one of a set of pairs of walls of the respective 3D modeled object, information representative of a relative orientation between the two walls of the respective pair. In other words, provided all walls of the respective 3D modeled object, a given set of pairs of walls are provided (example ways to determine such set are provided later). Furthermore, for each pair of walls of the given set, information relative to the relative orientation between the two walls is provided.

The information may generally be any type of one-wall-to-one-wall relative orientation information. The information may comprise or consist of a label representative of a relative orientation between the two walls of the respective pair. This allows an efficient grasping of the morphology of the mechanical part represented by the 3D modeled object.

The morphology signature may for example comprise or consist of a graph, with nodes each representing a respective wall and arcs between two nodes each associated with a label representative of a relative orientation between the two walls respective to the two nodes bounding the arc. The comparison of signatures may then amount to a graph comparison, which is fast. The graph comparison may be any type of comparison, and it may amount in an example to determining whether or not the two graphs are isomorph (an example of such determination is provided later). The arcs may be directed or undirected, depending on whether the information conveyed by the labels call for a direction between the two walls or not. The morphology signature may thus comprise or consist of this "graph+labels associated to arcs" data structure, or "labeled-arcs-graph". Information relative to the individual dimensions and/or individual proportions of the walls may be discarded. In other words, in an example the morphology signature does not comprise any information relative to the individual dimensions and/or individual proportions of the walls, but the morphology signature comprises only one-wall-to-one-wall relative orientation information.

In an example, the labels form a clique graph over the walls of the set of pairs of walls. This means by definition that, with respect to all the walls of the given set of pairs of walls, each pair of walls has a unique corresponding arc (i.e. any potential direction of the arc not being taken into account here). In other words, a given set of walls is provided, and all pairs of such given set are associated with a label. Yet in other words, for a given set of walls, for example all the walls of the 3D modeled object, e.g. provided filtering criteria, the morphology signature comprises information on one-wall-to-one-wall relative orientation for all possible pairs of walls. This makes the morphology signature particularly efficient, as for a given representative set of walls, the morphology signature comprises comprehensive information on one-wall-to-one-wall relative orientation. This notably helps diminishing false positives.

The method allows the following framework. Mechanical parts are modeled by solids, and a signature is designed to capture the morphology. The method for computing the morphology signature may include two steps. Firstly, representative walls of the part may be identified e.g. and coded by point-vector couples. Secondly, a graph may be computed in order to capture the relative orientations e.g. of the point-vectors couples. Searching a similar part, from the morphological point of view, may be to find parts in the database featuring the same graph signature as the input part. The method may make use of labeled graphs and labeled graphs matching. The graph of the method may make use of arcs labels only, as opposed to labeled graphs where not only arcs but also nodes have labels. This makes the signature more compact. Furthermore, graph morphisms defined in the method may disregard arc orientations. As opposed to solution which capture the relevant topological aspect through the structure of the graph (i.e. how nodes are connected by arcs), the graphs of the method of FIG. 1 may be clique graphs (arcs connecting all couples of nodes), and the relevant information is captured by labels associated with arcs. This speeds up the comparisons.

A wall of the 3D modeled object designates any pair of surface portions of the 3D modeled object opposite one to the other that represents a substantially regular slice-like portion of material (said material forming the mechanical part represented by the 3D modeled object). Such a surface portion constituting a wall is thus a substantially regular portion of the outer surface of the 3D modeled object, e.g. possibly featuring through holes and/or relatively small irregularities. Such a surface portion can be referred to as by the term "face" in the following, e.g. corresponding to a B-Rep face sub-data or to a reduction thereof. A reduction of a face is a portion of the face, e.g. obtained via a reduction process, such as the updating process of an example described later. A pair of faces "opposite one to the other" may mean that a percentage superior or equal to 75% of at least one of the two faces can be projected orthogonally on the other face. The percentage may be 100%. The faces of such a pair may be parallel or substantially parallel. For example one of the faces of the pair has a percentage superior or equal to 75% that is perfectly or substantially (e.g. with an error angle inferior to a threshold, e.g. less than 5 degrees) parallel to at least a corresponding portion of the other face. The percentage may be 100%.

By "label", it is here meant any value of a countable set. The morphology signature may thus involve, for a given 3D modeled object, the consideration of a certain set, elements of the set being pairs of walls (i.e. pairs of pairs of faces). The morphology signature then includes for each pair of such a set a label associated to the pair. The label is representative of a relative orientation between the two walls. In other words, the label provides information about how the two walls are oriented one with respect to the other. The expression "relative orientation" designates any information on how the two walls are oriented one with respect to the other. The labels of the morphology signature may thereby be determined within a predetermined set. The predetermined set may be any set representative of a taxonomy of relative orientations and the determination may be performed in any way. Particularly efficient examples are discussed later. Thus, this specific morphology signature grasps wall-to-wall relative orientation information, and thus correctly conveys morphology information relevant from the mechanical design point of view.

Different examples of the method that may be combined together and that increase the efficiency of the method with respect to relevance of the result and/or rapidity to determined and/or compare the morphology signature are now discussed. These examples achieve such increase of efficiency notably thanks to their discarding non-relevant information from a 3D modeled object when considering its morphology.

In an example, each label of the morphology signature is representative of a relative orientation between at least substantially planar walls. In other words, each label that forms a relevant information of the morphology signature relates to a pair of walls that are both planar, at least substantially. Yet in other words, the morphology signature does not include information regarding relative orientation between a pair of walls that includes a wall that is not at least substantially planar. By "substantially planar" it is meant that, for each of the two faces that form the wall, at least 75% of the face is planar (i.e. included in a plane). In an example, each label of the morphology signature is representative of a relative orientation between planar walls. In such an example, only perfectly planar walls (which also implies only perfectly planar faces) are considered in the morphology signature.

In an example, each label of the morphology signature is representative of a relative orientation between thin walls. In other words, all the walls involved in the morphology signature are thin walls. Yet in other words, the morphology signature does not include information regarding relative orientation between a pair of walls that includes a wall that is not a thin wall. A "thin wall" is a wall that is of thickness of the order of magnitude of the average thickness of the modeled object, for example inferior or equal to a number of times inferior or equal to ten times (e.g. four times) the average thickness of the modeled object. The average thickness may be defined as in the following document incorporated herein by reference: European patent application No. 15305809.4 filed on 28 May 2015. Thin walls may be recognized by comparing the thickness of the wall (i.e. average distance or shift between the two faces of the wall, which may correspond to the average thickness according to the definition of EP15305809.4 of the envelope of the wall, e.g. represented by any datum or proxy) to a representative datum or proxy of the average thickness of the solid represented by the modeled object. This representative or proxy may be determined according to any of the methods described in European patent application No. 15305809.4 filed on 28 May 2015, or equal to the value determined by any of the methods described in said document.

In an example, each label of the morphology signature is representative of a relative orientation between relatively large walls. In other words, all the walls involved in the morphology signature are relatively large, meaning that their surface is beyond a predetermined threshold, e.g. depending on the area of the whole outer surface of the 3D modeled object. The threshold may be a percentage below 10% of the whole outer surface of the 3D modeled object, for example below 5%, yet below 3%, and/or above 0.1%, yet 0.5%, for example 1%.

In an example, each label is determined within a predetermined finite set of labels. In other words, only a finite set of possible values is provided for the labels. Thus, a predetermined and finite set of values of wall-to-wall relative orientation is predetermined, and each label of the morphology signature is determined as one of these values. In such an example, the morphology signature is based on manipulations of a finite set of labels, such that is very fast to calculate and small to store (in terms of memory required). This also goes with a fast and simple comparison program, which makes the method very efficient in a context of massive computing where data access is critical. The method in such examples provides a robust, simple and rapid way to compute a morphology signature. Thus, signature computation as well as searching is made faster, and the signature can be computed for any shape of solid. Furthermore, the signature is easy to implement and the software is easy to maintain.

Figure 19:
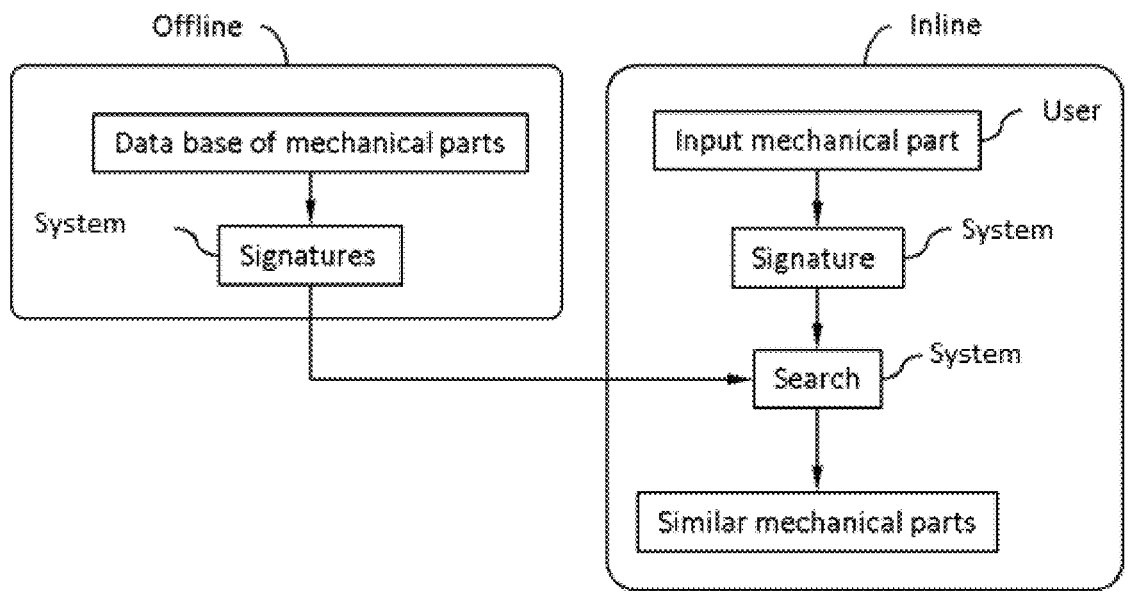

An example of an overall process including the method of FIG. 1 is now discussed and shown on FIG. 19.

The process deals with similar parts recognition. Each part in the database is equipped with a signature. These signatures are computed and stored during an offline process. The signature of the input part provided by the user is computed and compared to signatures in the database. This is performed during a "search" step during an inline (or online) process. Parts featuring the same signature as the one of the input part are selected and provided to the user as the similar parts.

The method thus defines a signature that is able to capture morphological information, typically: X-shape, T-shape, H-shape, Y-shape, Z-shape, Π-shape, O-shape, U-shape, Ω-shape, etc. This list is not exhaustive. In fact, if the input part features, for example, a H-shape, the method naturally reports H-shape parts out of the database without reference to a predefined dictionary of shapes.

Different examples of implementation of the method are now discussed. In these implementations, the morphology signature comprises, for each respective one of a set of pairs of walls of the respective 3D modeled object, a label representative of a relative orientation between the two walls of the respective pair. Also, the labels form a clique graph over the walls of the set of pairs of walls. Also, each label of the morphology signature is representative of a relative orientation between at least substantially planar walls (e.g. the perfectly planar example being illustrated later). Also, each label of the morphology signature is representative of a relative orientation between thin walls. Also, each label is determined within a predetermined finite set of labels. Also, each wall is associated to a respective node that includes a point and a respective normal vector (in other words, the node of the graph—to which the wall is associated—is also associated to a couple consisting of a point and a normal vector, representative of the wall, e.g. the point being a 3D positions and/or representing a center of gravity of the wall, and/or e.g. the normal vector being a 3D vector and/or representing a direction normal to the wall, e.g. at the point). Geometries associated to the point and the respective normal vector are involved to determine values labels.

Figure 20:
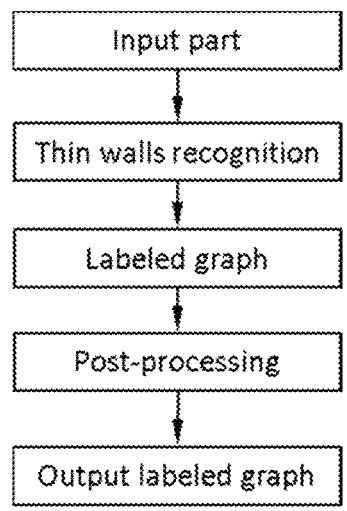

An example of signature computation is first discussed and illustrated by FIG. 20.

The signature of the example is a labeled graph. The signature may be computed according to the following steps. Thin walls are recognized on the input part. Then, the geometry of these walls is abstracted through point-vector couples $(p_i, n_i)$. These point-vector couples are the nodes of the graph. Arcs connecting two nodes are labeled with symbols that are designed to capture the relative orientations of point-vector nodes. The post-processing makes the graph more suitable for the comparison process.

An example of thin walls recognition is now discussed.

Figure 21:
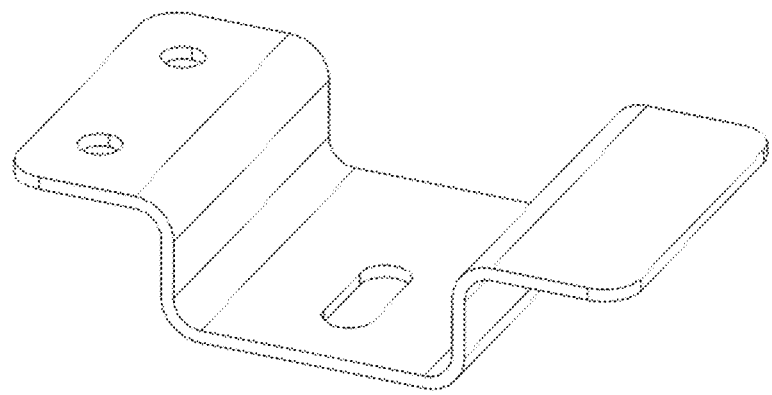
Figure 22:
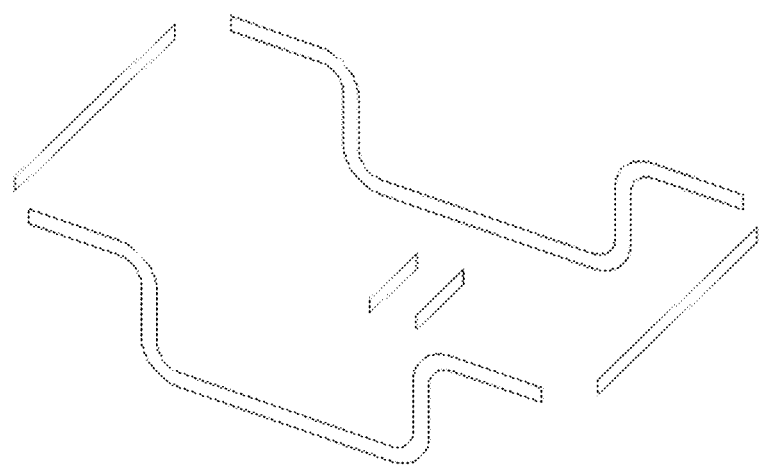

Thin walls recognition may be to identify characteristic couples of parallel faces. The algorithm may deal only with representative planar faces of the solid. Non-planar faces may be discarded. Planar faces featuring an area that is smaller than 1% of the total area of the solid may be discarded as well. FIG. 21 illustrates a typical Ω-shape part. FIG. 22 illustrates discarded planar faces due to a too small relative area. The triple $(g_i, v_i, a_i)$ is computed and stored for each representative planar face $F_i$ where $g_i$ is its center of gravity, $v_i$ is its outer normal vector and $a_i$ is its area. The representative thickness t of the solid may be computed by using the thickness signature σ as defined by earlier-cited European patent application EP15305809.4 filed on 28 May 2015. The thickness signature may be expanded by a safety coefficient to result in the representative thickness, such that t=2σ. These data are intensively used for the wall recognition of the example.

In a first step of the example, representative couples (i, k) of faces are identified by checking the following criterions.

First, faces of a couple must be parallel with opposite outer normal vectors:

$$\langle v_i, v_k \rangle \approx -1$$

Figure 23:
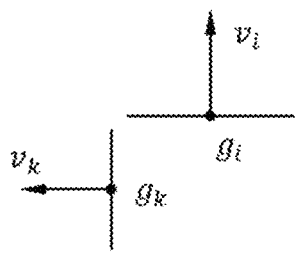

FIG. 23 illustrates a non-representative couple of faces according to this criterion.

Second, the thickness of the portion defined by two parallel faces must include a representative amount of material:

$$0 < \langle g_i - g_k, v_i \rangle \leq t$$

or, equivalently, $$0 < \langle g_k - g_i, v_k \rangle \leq t$$

Figure 24:
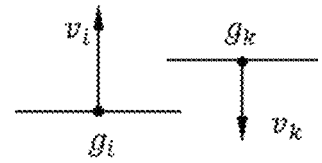

FIG. 24 illustrates a non-representative couple of faces according to this criterion.

Third, the relative shift $s = \|(g_i - g_k) \times v_k\|$ of parallel faces should not be too large compared to faces size:

$$\frac{s}{t} \leq 2 \frac{\max(a_i, a_k)}{\min(a_i, a_k)}$$

Figure 25:
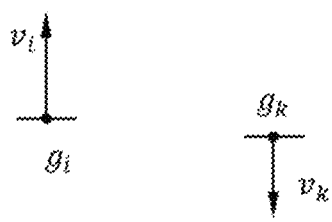

FIG. 25 illustrates a non-representative couple of faces according to this criterion.

Figure 26:
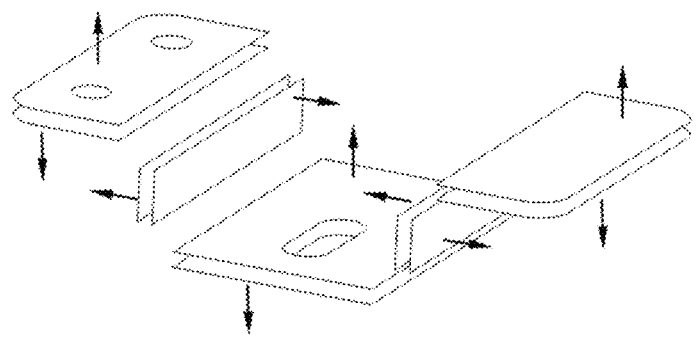

At this point of the example of determination of the morphology signature of a 3D modeled object, couples of faces are defined, and some faces can be shared by several couples. FIG. 26 illustrates the couples of faces of the exemplary part of FIGS. 21-25.

The goal in the example is now to identify thin walls by analyzing these couples of faces. Faces shared by several couples are updated in order to appropriately contribute to several thin walls. A thin wall is defined by a couple (p, n) where p is a point and n a normalized vector.

The following pseudo-code illustrates an implementation:

```
01    For all couples (i, k) of faces do begin
02        If faces i and k have the same area, that is |a_i − a_k| ≈ 0,
          then
03            Create a new thin wall (p, n) by setting p = 1/2 (g_i + g_k) and n = v_k 04            Remove all couples involving index i or index k.
05        Else (suppose for readability that a_i < a_k)
06            g = g_i + ⟨g_k − g_i, v_k⟩ v_k
07            Create a new thin wall (p, n) by setting p = 1/2 (g_i + g) and n = v_k 08            Update data of face k:
09
              g_k := a_k/(a_k − a_i) g_k − a_i/(a_k − a_i) g 10            a_k := a_k − a_i
11            Remove all couples involving index i.
12        End if
13    End for
```

Figure 27:
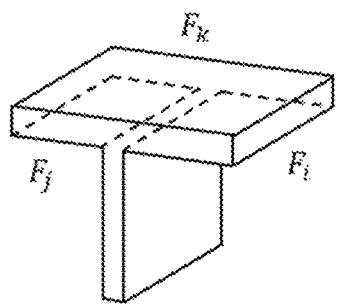

The updating sequence is effective in the T-shape configuration, as illustrated in FIG. 27 with (i, k) couple. In this example, the updating sequence (steps 06 to 10 in previous algorithm) changes the numerical data of face k. FIG. 28 illustrates the initial situation. FIG. 29 illustrates the situation after a thin wall (p, n) involving face i and a part of face k is identified. Area of face k is made smaller and its center of gravity is moved accordingly.

Continuing the example, the updating sequence (steps 06 to 10 in previous algorithm) changes again the numerical data of (the updated) face k when it is associated with face j. FIG. 30 illustrates the situation after a thin wall (p', n') involving face j and a part of face k is identified. Area of face k is smaller and its center of gravity is moved accordingly. The reduced face k is discarded because it is not associated with any other face.

In conclusion, the thin wall recognition of the example yields a list of N point-vector couples respectively representing thin walls of the input part. The vector orientation is arbitrary, but it may be reworked later (as shown in a later-provided example).

FIG. 31 illustrates the N=5 point-vector couples of the exemplary part.

An example of graph definition is now discussed.

Each node of the graph is a point-vector couple. Nodes are numbered from 1 to N. Arcs joining each node to all other nodes are considered. This is the so-called "clique" graph and it features $$\frac{N(N-1)}{2}$$

arcs. Arcs are conventionally directed from the lower node number to the larger node number, as illustrated in FIG. 32 with N=5. For convenience, such a graph may equivalently be represented by using a table rather than a drawing. In the table of FIG. 33, N=5 and symbol X identifies useless cells. Each empty cell is dedicated to collect information about the arc directed from cell's row number to cell's column number.

Examples of arc labels that are particularly efficient are now discussed.

In these examples, each wall is associated to a respective node that includes a point and a respective normal vector, as described above. Then, (the value of) a label representative of the relative orientation between a wall associated to a node $(p_1, n_1)$ and a wall associated to a node $(p_2, n_2)$ is defined according to (values of) a list of at least one geometrical feature that involve points $p_1$ and $p_2$ and normal vectors $n_1$ and $n_2$. This list of geometrical feature(s) may comprise or consist of any one or combination of the following geometrical features:

the sign of the distance from $p_2$ to the plane defined by $(p_1, n_1)$, the sign of the distance from $p_1$ to the plane defined by $(p_2, n_2)$, the sign of the norm of the normal vectors cross product, and/or the sign of the normal vectors scalar product.

In other words, in order to define the label of an arc when determined the morphology signature of a 3D modeled object, the method may amount to compute the value of any or a combination of these geometrical with respect to the walls connected by the arc, and (e.g. according the orientation of the arc or provided a re-orientation of the arc) determine the label (e.g. from a predetermined and finite list) based on these values.

A specific implementation of these examples that is particularly efficient is now provided. The arc labels may be determined in the predetermined finite set of labels defined in the following.

The goal of labelling is to encode the relative orientation of two point-vector couples into a sequence of three symbols. This coding is designed to capture relevant geometrical configurations and to facilitate automatic graph comparisons. In the following a "sign" can be "−", "0" or "+". Symbol $\langle x, y \rangle$ is the scalar product of vectors x and y.

Given two point-vector couples $(p_1, n_1)$ and $(p_2, n_2)$ the label of the directed arc from node $(p_1, n_1)$ to node $(p_2, n_2)$ is defined according to the following quantities. The sign of the distance from $p_2$ to the plane defined by $(p_1, n_1)$, that is $d_{12}=\text{Sgn}\langle p_2-p_1, n_1 \rangle$, the sign of the distance from $p_1$ to the plane defined by $(p_2, n_2)$, that is $d_{21}=\text{Sgn}\langle p_1-p_2, n_2 \rangle$, the sign of the norm of the vectors cross product $c=\text{Sgn}\|n_1 \times n_2\|$ and the sign of the vectors scalar product $s=\text{Sgn}\langle n_1, n_2 \rangle$. Conventionally, $\text{Sgn}\langle p-q, n \rangle$ is set to 0 when the absolute value $|\langle p-q, n \rangle|$ is smaller than thickness t. The combinations of these quantities are as follows.

Figure 35:
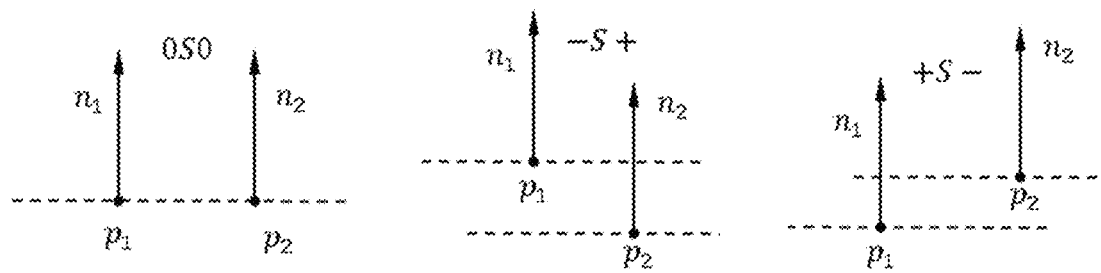
Figure 36:
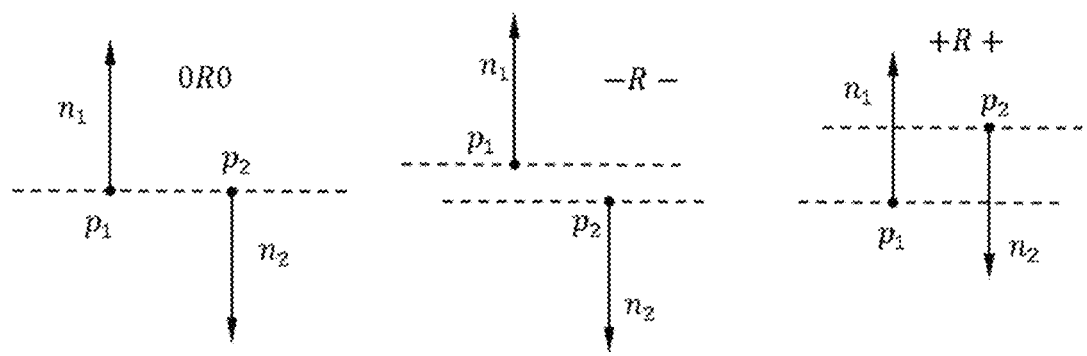

If c=+, meaning that the vectors $n_1$, $n_2$ are not collinear, then all nine couples $(d_{12}, d_{21})\in\{-,0,+\}^2$ are considered. They are symbolized $d_{12}Ad_{21}$ and they are {−A−, −A0, −A+, 0A−, 0A0, 0A+, +A−, +A0, +A+}. FIG. 34 illustrates all situations. If c=0 and s=+, meaning that $n_1=n_2$, then all three possible couples $(d_{12}, d_{21})$ are considered. They are symbolized $d_{12}Sd_{21}$ they are {0S0, −S+, +S−}. Symbol S means "same vectors". For geometrical reasons, −S+S+, 0S+, +S0, −S0 and 0S− are impossible. FIG. 35 illustrates all situations. If c=0 and s=−, meaning that $n_1=-n_2$, then all three possible couples $(d_{12}, d_{21})$ are considered. They are symbolized $d_{12}Rd_{21}$ and they are {0R0, −R−, +R+}. Symbol R means "reverse vectors". For geometrical reasons, −R+, +R−, 0R+, +R0, −R0 and 0R− are impossible. FIG. 36 illustrates all situations. Stated in a general way, the babel of the arc from node $(p_i, n_i)$ to node $(p_j, n_j)$ with i<j is $d_{ij}Xd_{ji}$ with $d_{kl}=\text{Sgn}\langle p_l-p_k, n_k \rangle$ and $X\in\{A, S, R\}$.

Figure 37:
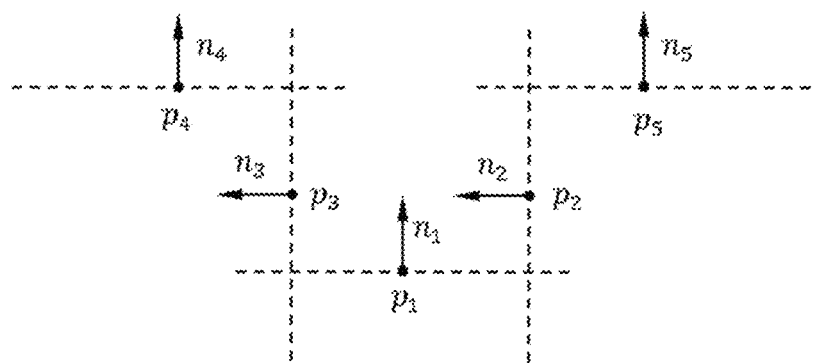
Figures 38, 39:
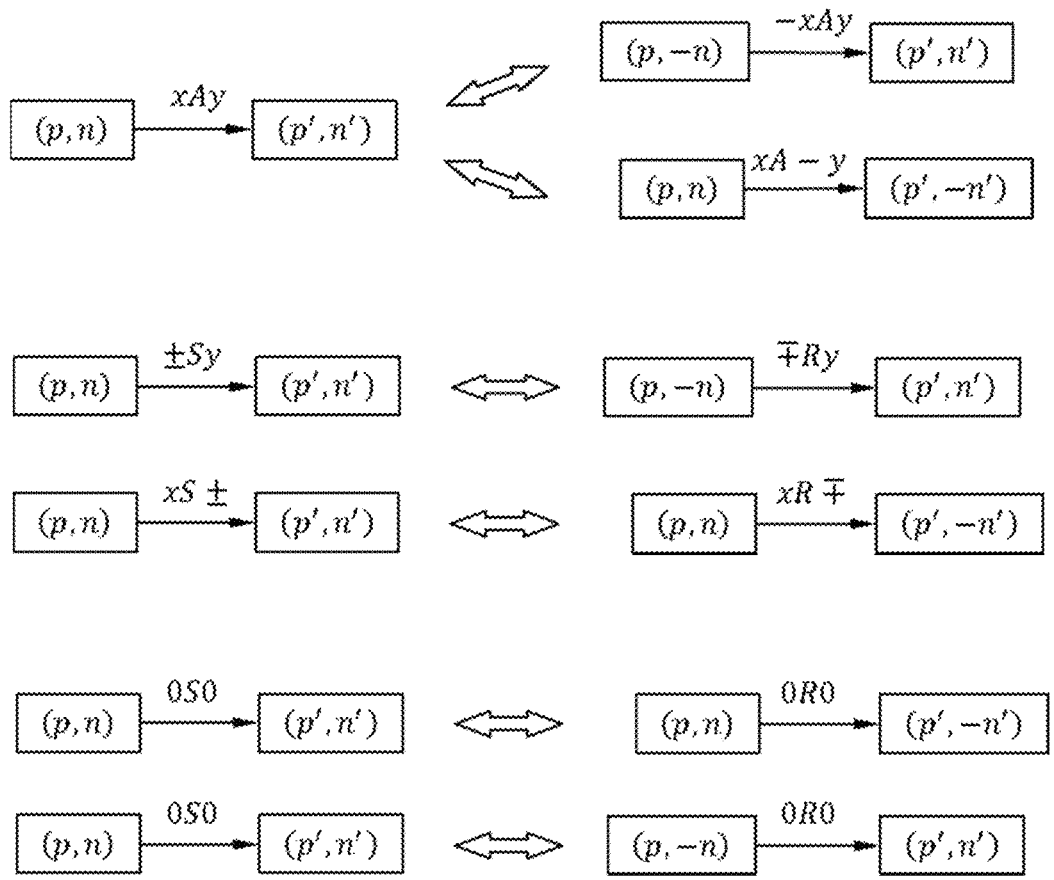

The five point-vector couples of the exemplary solid are illustrated in FIG. 37. This configuration is based on arbitrary vectors orientations. The associated labeled graph is as represented in the table of FIG. 38.

Post-processing (e.g. that may occur offline) is now discussed. This post-processing amounts to editing the arc orientations (and thus the labels) such that predetermined criteria are respected. The post-processing may include inverting vector(s) and/or arc(s), and changing label(s) accordingly. This way, the orientations globally respect the same convention, and morphology signatures may be compared directly.

How labels may change upon vector inversion and/or arc inversion is now discussed.

Because of geometrical coherence, the label in the examples discussed above is not independent of the arc orientation. Indeed, changing the orientation of an arc requires reading the symbols of the label from right to left. The so-called "transposition" operation, noted Tr: L→L, is to update the label when its arc orientation is reversed. Formally, Tr(xXy)=yXx, for all $X\in\{A, R, S\}$ and all x,y, $\in\{-,0,+\}$.

Switching the vector orientation of a node changes the labels of its incident arcs. It switches the leftmost symbol of the label attached to an output arc. It switches the rightmost symbol of the label attached to an input arc. It also changes symbol O into symbol R and vice-versa.

FIG. 39 illustrate all label changes due to vector inversion. FIG. 40 illustrates all label changes due to arc inversion.

An example of graph post processing is now discussed.

Clearly, a given geometry gives birth to a graph the labelling of which depends on the vectors' orientations. In order to make this labeling distinctive, the convention is to adjust the vectors' orientations in such a way that the number of "−" symbols is as small as possible. This may be done by iteratively changing $n_i$ into $-n_i$ and checking that the number of "−" symbols is decreasing. The iterations stop when the decreasing is impossible.

For all i∈{1, . . . , N} let $M_R(i)$ be the number of right "−" symbols in the i-th column; let $P_R(i)$ be the number of right "+" symbols in the i-th column; let $M_L(i)$ be the number of left "−" symbols in the i-th row; let $P_L(i)$ be the number of left "−" symbols in the i-th row.

In terms of arcs and nodes, $M_R(i)$ is the number of right "−" symbols of output arcs from node i; $P_R(i)$ is the number of right "+" symbols of output arcs from node i; $M_L(i)$ be the number of left "−" symbols of input arcs to node i; $P_L(i)$ be the number of left "−" symbols of input arcs to node i.

Integer function b(i) is the balance function and is defined by $$b(i) := M_R(i) + M_L(i) - P_R(i) - P_L(i)$$

It is the number of "−" symbols changed into "+" symbols minus the number of "+" symbols changed into "−" symbols if vector $n_i$ was reversed. The algorithm ends when balance b(i) is negative for all vectors $n_i$.

The algorithm may be as follows:
While exists i∈{1, . . . , N} such that b(i)>0 do begin
Reverse vector $n_i$ and update line i and column i.
End while For example, according to the exemplary table, b(1)=0+0−0−4=−4, b(2)=0+1−1−2=−2, b(3)=2+1−0−1=2, b(4)=3+0−0−0=3 and b(5)=3+0−0−0=3.

FIG. 41 illustrates the resulting exemplary table featuring the smallest number of "−" symbols. FIG. 42 illustrates the corresponding exemplary geometry. Notice that $n_3$, $n_4$ and $n_5$ are reversed.

Examples of graph comparison, that is morphology signature comparison, are now discussed.

The well-known earlier-mentioned concept of labeled directed graph is now further discussed.

Graph comparison requires a special mathematical formalism. A labeled directed graph is a 6-tuple $G=(X_G, U_G, \alpha_G, \omega_G, t_G, L)$ where $X_G = \{(p_i, n_i), i=1, \ldots, N\}$ is the set of nodes, $$U_G = \left\{1, 2, \ldots, \frac{N(N-1)}{2}\right\}$$

is the set of arcs, $$L = \{-A-, -A0, -A+, 0A-, 0A0, 0A+, +A-, +A0, +A+, 0S0, -S+, +S-, 0R0, -R-, +R+\}$$

is the set of arcs' labels, $\alpha_G: U_G \to X_G$ defines start nodes of arcs, $\omega_G: U_G \to X_G$ defines end nodes of arcs and $t_G: U_G \to E$ associates a label to each arc.

Given a input part, its graph signature is computed, and the searching process is to find similar graph signatures in the database. So, the core of the process is to compare the graph signature of the input part to a graph signature of the database. The graph signature of the input part is noted $G=(X_G, U_G, \alpha_G, \omega_G, t_G, L)$. The graph signature of the database part is noted $H=(X_H, U_H, \alpha_H, \omega_H, t_H, L)$. Notice that the set L of labels is the same for both graphs.

The well-known concept of graph isomorphism is now discussed.

Figure 43:
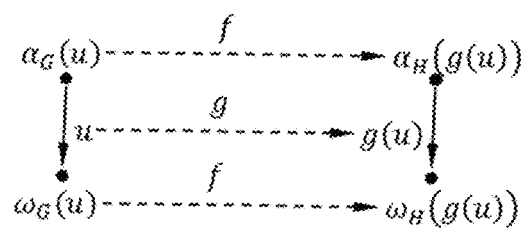
Figure 44:
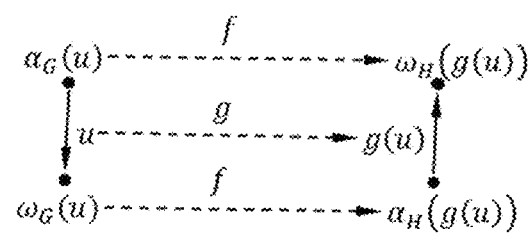

By definition, an isomorphism between graphs G and H is a couple of one-to-one mappings f: $X_G \to X_H$ and g: $U_G \to U_H$. Mapping f associates each node of graph G with a node of graph H. Mapping g associates each arc of graph G with an arc of graph H. In addition, mappings f and g are such that, for all u∈$U_G$, either $f(\alpha_G(u))=\alpha_H(g(u))$ and $f(\omega_G(u))=\omega_H(g(u))$, as illustrated in FIG. 43, or $f(\alpha_G(u))=\omega_H(g(u))$ and $f(\omega_G(u))=\alpha_H(g(u))$, as illustrated in FIG. 44.

Label compatible graph isomorphism is now discussed.

By definition, the isomorphism f, g is label-compatible if, in addition, associated arcs have equivalent labels according to arcs orientations. This is implemented by the following SameLabel(u, v) function that uses the label transposition described previously.

```
SameLabel(u, v)
    If f(α_G(u)) = α_H(v) and f(ω_G(u)) = ω_H(v) then
        If t_G(u) = t_H(v) return "true"
    Else if f(α_G(u)) = ω_H(v) and f(ω_G(u)) = α_H(v) then
        If t_G(u) = Tr(t_H(v)) return "true"
    End if
    Return "false"
```

The pseudo-code of SameLabel(u, v) function may also be read as follows:
If the start node of arc u is mapped with the start node of arc v and if the end node of arc u is mapped with the end node of arc v then
  If arcs u and v have the same label, return "true"
Else if the start node of arc u is mapped with the end node of arc v and if the end node of arc u is mapped with the start node of arc v then
  If the label of arc u is the same as the transposed label of arc v, return "true"
End if
Return "false"

An implementation of a comparison algorithm is now discussed.

The comparison algorithm of graphs G and H may be to build a label-compatible isomorphism between the two graphs (in other words, a 3D modeled object in the database is considered to respect the morphology criterion and returned only if such a compatible isomorphism can be built). It may require two working graphs respectively noted $A=(X_A, U_A, \alpha_A, \omega_A)$ and $B=(X_B, U_B, \alpha_B, \omega_B)$. Graph A is a sub-graph of graph G and graph B is a sub-graph of graph H. They are initialized with empty graphs. Function map(A, a, B, b) used at step 03 below updates the isomorphism and checks the label-compatibility. It is detailed later. Nodes additions at steps 04 and 05 below are detailed later. The overall algorithm is as follows:

```
01  A := ∅
02  B := ∅
03  While exist a ∈ X_G − X_A and b ∈ X_H − X_B such that map(A, a, B, b)
    is true do begin
04      Add node a to graph A
05      Add node b to graph B
06  End while
07  if A = G then
08      Return "match"
09  Else
10      Return "no match"
11  End if
```

Instruction "Add node a to graph A" at step 04 of the previous algorithm is to add node a to the set of nodes $X_A$ of graph A and to add to the set of arcs $U_A$ of graph A all arcs of graph G joining node a to a node of $X_A$.

Instruction "Add node b to graph B" at step 05 of the previous algorithm is to add node b to the set of nodes $X_B$ of graph B and to add to the set of arcs $U_B$ of graph B all arcs of graph H joining node b to a node of $X_B$.

The goal of function map(A, a, B, b) is to update the isomorphism (f, g) between graph A plus node a and graph B plus node b. This is done at steps 01 and 07 below by setting new values to mappings f and g. It also checks the label-compatibility of the updated isomorphism at step 06 below. Connections investigated at steps 02, 03 and 05 below do not take arcs orientations into account. Function SameLabel(u, v) at step 06 compares labels of arcs u∈$U_G$ and v∈$U_H$ according to arcs orientation, as previously explained.

```
00   map(A, a, B, b)
01      f(a) := b
02      For all node x ∈ X_A connected to node a by an arc of U_G do
           begin
03         Let u ∈ U_G be the arc connecting x and a
04         y := f(x)
05         Let v ∈ U_H be the arc connecting y and b
06         If SameLabel(u, v) then
07            g(u) := v
08         Else
09            Return "false"
10         End if
11      End for
12      Return "true"
```

Figure 45:
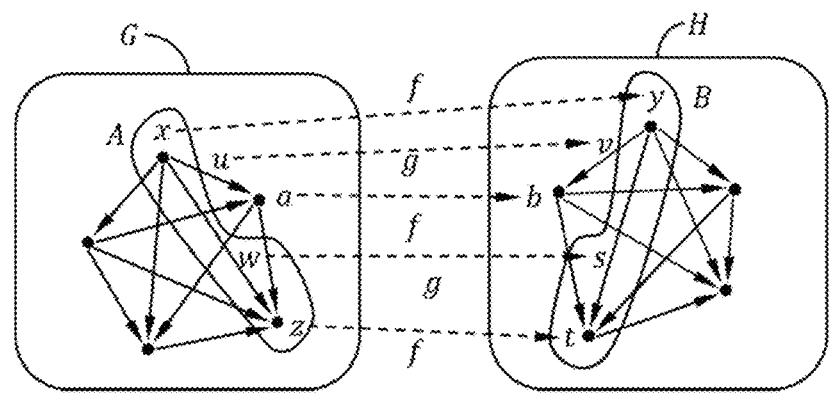

FIG. 45 illustrates the map(A, a, B, b) function environment.

While example embodiments have been particularly shown and described, it will be understood by those skilled in the art that various changes in form and details may be made therein without departing from the scope of the embodiments encompassed by the appended claims.

What is claimed is:

1. A computer-implemented method for querying a database, the database comprising 3D modeled objects that each represent a mechanical part, the database further comprising, for each 3D modeled object, a respective morphology signature, the method comprising:
   providing, to the database, a query that includes a morphology criterion, the morphology criterion received from a user via a computing device; and
   returning, to the computing device, as results of the query, respective 3D modeled objects of the database, a respective 3D modeled object being returned based on an extent to which the respective 3D modeled object has a morphology signature that respects the morphology criterion, the respective 3D modeled object having a set of pairs of two walls, a wall of the respective 3D modeled object being a pair of surface portions of the respective 3D modeled object opposite one to the other that represents a substantially regular slice-like portion of material, the morphology signature comprising a set of labels, the set of labels including, for each respective pair of the set of pairs of two walls, a label representative of a relative orientation between the two walls of the respective pair.

2. The method of claim 1, wherein the set of pairs of two walls forms a set of walls, and the set of labels forms a clique graph over the set of walls.

3. The method of claim 1, wherein each label of the morphology signature is representative of a relative orientation between at least substantially planar walls.

4. The method of claim 1, wherein each label of the morphology signature is representative of a relative orientation between thin walls.

5. The method of claim 1, wherein each label is determined within a predetermined finite set of labels.

6. The method of claim 5, wherein each wall is associated to a respective node that includes a point and a respective normal vector, the label representative of the relative orientation between a wall associated to a node ($p_1$,$n_1$) and a wall associated to a node ($p_2$,$n_2$) being defined according to at least one of: a sign of a distance from $p_2$ to a plane defined by ($p_1$,$n_1$), a sign of a distance from $p_1$ to a plane defined by ($p_2$,$n_2$), a sign of a norm of normal vectors cross product, and a sign of normal vectors scalar product.

7. A non-transitory data storage medium having recorded thereon a database comprising:
   3D modeled objects, the database comprising, for each 3D modeled object, a respective morphology signature; and
   wherein the database is configured to return to a computing device, as results to a query from the computing device including a morphology criterion, a given 3D modeled object stored in the database, the given 3D modeled object being returned based on an extent to which the given 3D modeled object has a morphology signature that respects the morphology criterion, the given 3D modeled object having a set of pairs of two walls, a wall of the given 3D modeled object being a pair of surface portions of the given 3D modeled object opposite one to the other that represents a substantially regular slice-like portion of material, the morphology signature comprising a set of labels, the set of labels including, for each respective pair of the set of pairs of two walls, a label representative of a relative orientation between the two walls of the respective pair.

8. The data storage medium according to claim 7, wherein the set of pairs of two walls forms a set of walls, and the set of labels forms a clique graph over the set of walls.

9. The data storage medium according to claim 7, wherein each label of the morphology signature is representative of a relative orientation between at least substantially planar walls.

10. The data storage medium according to claim 7, wherein each label of the morphology signature is representative of a relative orientation between thin walls.

11. The data storage medium according to claim 7, wherein each label is determined within a predetermined finite set of labels.

12. The data storage medium according to claim 11, wherein each wall is associated to a respective node that includes a point and a respective normal vector, the label representative of the relative orientation between a wall associated to a node ($p_1$,$n_1$) and a wall associated to a node ($p_2$,$n_2$) being defined according to at least one of: a sign of a distance from $p_2$ to a plane defined by ($p_1$,$n_1$), a sign of a distance from $p_1$ to a plane defined by ($p_2$,$n_2$), a sign of a norm of normal vectors cross product, and a sign of normal vectors scalar product.

13. A non-transitory data storage medium comprising:
   a memory area having recorded thereon a computer program; and
   the computer program comprising instructions for responding to a query that includes a morphology criterion, and for performing a processing of data relative to a database, the database comprising 3D modeled objects that each represent a mechanical part, the database further comprising, for each 3D modeled object, a respective morphology signature, wherein responding to the query includes:
      returning to a computing device, as results to the query, a given 3D modeled object stored in the database, the given 3D modeled object being returned based on an extent to which the given 3D modeled object has a morphology signature that respects the morphology criterion, the given 3D modeled object having a set of pairs of two walls, a wall of the given 3D modeled object being a pair of surface portions of the given 3D modeled object opposite one to the other that represents a substantially regular slice-like portion of material, the morphology signature comprising a set of labels, the set of labels including, for each respective pair of the set of pairs of two walls, a label representative of a relative orientation between the two walls of the respective pair.

14. The data storage medium of claim 13, wherein the processing of data relative to the database comprises constructing the database.

15. The data storage medium of claim 14, wherein the constructing of the database comprises:
    providing the modeled objects;
    determining, for each 3D modeled object, the respective morphology signature of the 3D modeled object; and
    storing a relation between each 3D modeled object and its respective morphology signature.

16. A system comprising:
    a processor coupled to a memory;
    the memory having recorded thereon a computer program comprising instructions for performing querying of a database, the database comprising 3D modeled objects that each represent a mechanical part; and
    the database further comprising, for each 3D modeled object, a respective morphology signature, the instructions performing querying of the database by:
        providing a query that includes a morphology criterion, the morphology criterion being received from a user via a computing device; and
        returning, to the computing device, as results of the query, respective 3D modeled objects of the database, a respective 3D modeled object being returned based on an extent to which the respective 3D modeled object has a morphology signature that respects the morphology criterion, the respective 3D modeled object having a set of pairs of two walls, a wall of the respective 3D modeled object being a pair of surface portions of the respective 3D modeled object opposite one to the other that represents a substantially regular slice-like portion of material, the morphology signature comprising a set of labels, the set of labels including, for each respective pair of the set of pairs of two walls, a label representative of a relative orientation between the two walls of the respective pair.

* * * * *